United States Patent Office 3,743,731
Patented July 3, 1973

3,743,731
SUBSTITUTED BENZAZEPINES FOR PRODUCING SKELETAL MUSCLE RELAXATION
Lewis A. Walter, Madison, N.J., assignor to Schering Corporation, Bloomfield, N.J.
No Drawing. Filed Mar. 16, 1971, Ser. No. 124,914
Int. Cl. A61k 27/00
U.S. Cl. 424—244  11 Claims

ABSTRACT OF THE DISCLOSURE

This disclosure relates to substituted 1-phenyl-2,3,4,5-tetrahydro-1H-3-benzazepines, to methods for their preparation, and to their use as muscle relaxants.

---

The invention sought to be patented relates to compositions of matter classified in the art of chemistry as being derivatives of 1-phenyl-2,3,4,5-tetrahydro-1H-3-benzazepines and to processes for making and using such compositions.

The compounds of this invention may be represented by the structural formula:

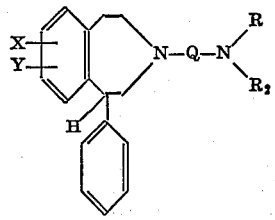

and the optical isomers and the pharmaceutically acceptable acid addition salts thereof, wherein X and Y are independently selected from the group consisting of hydrogen, lower alkyl, lower alkoxy, halogen, hydroxy and taken together form alkylenedioxy having up to 3 carbon atoms; $R_1$ and $R_2$ are members independently selected from the group consisting of hydrogen and lower alkyl and Q is lower alkylene.

As used herein, the term "lower alkyl" includes those carbon radicals having one to six carbon atoms. Included within this definition are the straight, branched-chain and cyclic radicals. Exemplifying the term lower alkyl are methyl, ethyl, isopropyl, pentyl, cyclohexyl and hexyl. The "lower alkoxy" radicals are those radicals having one to six carbon atoms attached to the nucleus through an oxygen atom and include such radicals as methoxy, ethoxy and propoxy. The "alkylenedioxy" radicals include methylenedioxy, ethylenedioxy and propylenedioxy. The term "lower alkylene" includes those radicals having two to six carbon atoms, preferably including 1,3-propylene, 1-methylethylene, 1-ethylethylene, 1-ethyl-1,3-propylene and 1,4-butylene.

The acid addition salts include those prepared from such acids as hydrochloric acid, phosphoric acid, sulfuric acid, maleic acid, citric acid and other well known pharmaceutically acceptable acid addition forming acids.

The compounds of this invention exhibit optical isomerism and the racemic mixture as well as the individual d and l isomers are considered to be part of the invention, although the l-isomer is preferred.

In general, it is preferred to prepare the desired substituted benzazepines (I) of this invention by the condensation of an approximately X,Y-substituted benzazepine (II) with an acrylonitrile (III) or a halonitrile (IV) to form a 3-cyanoalkylbenzazepine intermediate (Va) or (Vb), which may be chemically reduced to form a 3-aminoalkylbenzazepine (Ia) or (Ib), respectively.

In effecting the foregoing condensation reaction between the benzazepine (II) and the acrylonitrile (III) or halonitrile (IV), it is preferred to heat a solution containing the reactants up to about reflux temperatures. Preferred solvents for the reactants are such inert solvents as alkanols (preferably isopropanol) although other inert solvents may be advantageously used.

Reaction Scheme A depicts the preparation of the 3-aminoalkylbenzazepines (Ia) using an acrylonitrile (II) and Reaction Scheme B depicts the preparation of the 3-aminoalkylbenzazepines (Ia) using a halonitrile (IV).

Reaction Scheme A

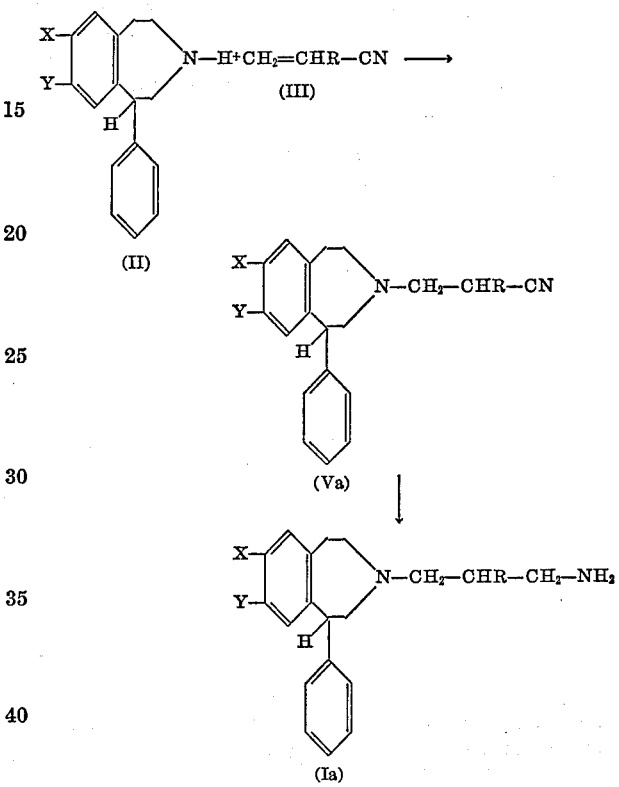

wherein X and Y are as previously defined and R is hydrogen or lower alkyl having up to 3 carbon atoms. It should of course be realized that Reaction Scheme A may not be used in those instances wherein it is desired to have 3-(2-aminoethyl)-substituent.

Reaction Scheme B

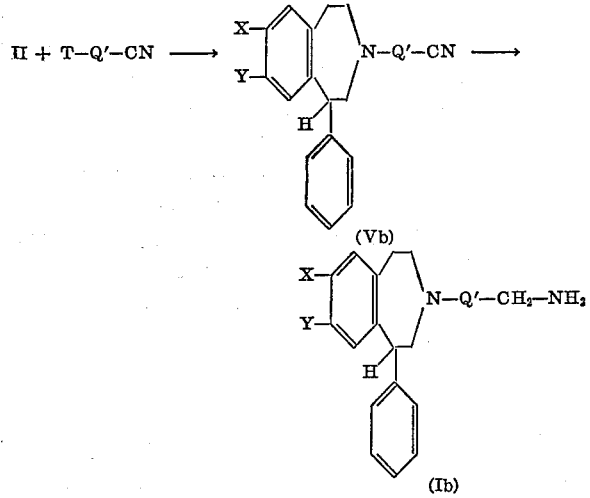

wherein X and Y are as previously defined, T is chloro, bromo or iodo, and Q' is an alkylene radical having up to 5 carbon atoms.

In those instances wherein the desired compound bears a secondary or tertiary aminoalkyl function at the 3-position, the aminoalkylbenzazepines (Ia) or (Ib) may be alkylated according to standard techniques. Exemplifying such techniques are the reactions of the primary amine with formic acid and formaldehyde in those instances wherein it is desired to prepare a dimethylamino moiety, and the reaction of the amine with an appropriate acyl halide (VI), which is then reduced by standard chemical techniques, such as with lithium aluminum hydride, to prepare other dialkylamino compounds.

Reaction Scheme C depicts the prepararation of secondary amine (Ic) from an appropriately substituted benzazepine (Ib). The benzazepine (Ib) is reacted with an acyl halide (VI) at low temperatures within the range of about −20° to about 10° C., thereby forming an intermediate acylated derivative (VII) which is then chemically reduced to the desired benzazepine (Ic).

Reaction Scheme C

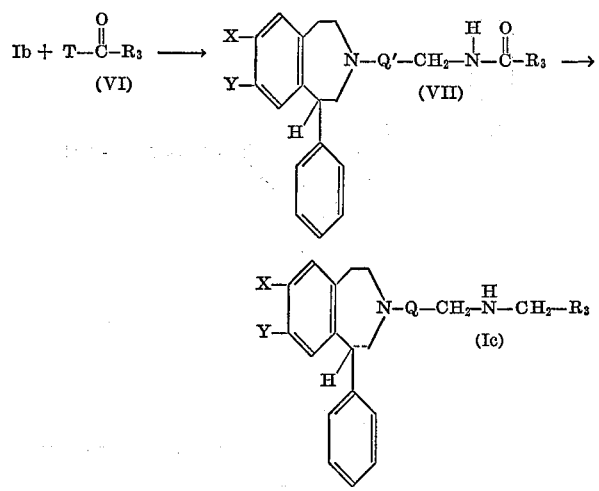

wherein X, Y, T and Q are as previously defined and $R_3$ is a lower alkyl moiety having up to 5 carbon atoms.

When it is desired to have $R_1$ and $R_2$ be two dissimilar lower alkyl groups, the procedure of Reaction Scheme C may be used whereby lower alkyl groups having dissimilar $R_3$ components are introduced.

Alternatively, the compounds of Formula I may be prepared by using an appropriately substituted benzazepin-2-one from appropriately substituted benzazepin-2-ones (VIII) by the use of the alkylating procedures of Reaction Schemes A, B and C on appropriately substituted benzazepin-2-ones to produce 2-one intermediates which are subjected to chemical reduction to produce the desired compounds of Formula I. The benzazepin-2-one starting materials (VIII) are known compounds.

The following examples are illustrative of methods for preparing compounds of this invention.

EXAMPLE 1

3-(3-aminopropyl)-7,8-dimethoxy-1-phenyl-2,3,4,5-tetrahydro-1H-3-benzazepine dimaleate Part A.—Reflux 20 g. of 7,8 - dimethoxy - 1 - phenyl-2,3,4,5 - tetrahydro - 1H-3-benzazepine and 10 ml. of acrylonitrile in 300 ml. of isopropanol for 20 hours. Concentrate the solution to one-third the original volume, cool and induce crystallization. Filter and wash the crystals with isopropanol, yielding 3 - (2 - cyanoethyl)-7,8-dimethoxy - 1 - phenyl - 2,3,4,5-tetrahydro-14,3-benzazepine, M.P. 119–120° C.

Part B.—Hydrogenate 20 g. of 3-(2-cyanoethyl)-7,8-dimethoxy - 1 - phenyl - 2,3,4,5 - tetrahydro - 1H - 3-benzazepine with two teaspoonfuls of Raney nickel catalyst in 200 ml. of ethanol which has been saturated with ammonia. When the calculated amount of hydrogen has been absorbed, filter the catalyst, decolorize the filtrate with charcoal and concentrate to dryness in vacuo. Dissolve the residue in 100 ml. of acetonitrile, add two molar equivalents of maleic acid and heat the resulting mixture until all the acid dissolves. Cool, filter and recrystallize the 3 - (3 - aminopropyl) - 7,8 - dimethoxy - 1 - phenyl-2,3,4,5 - tetrahydro - 1H,3-benzazepine dimaleate, M.P. 171–172° C., from ethanol.

EXAMPLE 2

3-(3-amino-2-methylpropyl)-7,8-dimethoxy-1-phenyl-2,3,4,5-tetrahydro-1H-3-benzazepine Part A.—Reflux 56 g. of 7,8 - dimethoxy - 1 - phenyl-2,3,4,5 - tetrahydro - 1H - 3 - benzazepine and 20 g. of methacrylonitrile in 250 ml. of 75% aqueous methanol for twenty-four hours. Concentrate in vacuo on a steam bath. Add 5 ml. of acetic anhydride and two drops of pyridine and keep at room temperature overnight. Dissolve in 500 ml. of ether, extract with excess 1 N hydrochloric acid, basify the acid extract with excess cold dilute sodium hydroxide and extract with benzene. Evaporate the benzene and crystallize the residue from 75 ml. of ethanol to obtain racemate A, 3 - (2 - cyanopropyl)-7,8-dimethoxy - 1 - phenyl - 2,3,4,5 - tetrahydro - 1H-3-benzazepine, M.P. 91–92° C. after additional crystallizations. Concentrate the first ethanol liquor to dryness in vacuo and crystallize the residue from isopropanol to obtain racemate B, M.P. 96–98° C.

Part B.—Hydrogenate racemate A from part A of this example by the procedure described in Example 1, Part B. Convert the 3 - (3 - amino-2-methylpropyl)-7,8-dimethoxy-1-phenyl-2,3,4,5-tetrahydro-1H-3-benzazepine to the difumarate salt in ethanol and obtain white crystals, M.P. 176.5–177.5° C.

By the same procedure, hydrogenate racemate B and convert the hydrogenated base to the monofumarate salt in ethanol, M.P. 166–168° C.

EXAMPLE 3

3-(3-aminopropyl)-7,8-dimethoxy-1-phenyl-2,3,4,5-tetrahydro-1H-3-benzazepine dimaleate Part A.—Heat a mixture containing 50 g. of homoveratrylamine and 50 g. of ethyl mandelate in an oil bath at 180–200° C. for three hours. Cool, dissolve in chloroform and wash successively with dilute hydrochloric acid, water and sodium bicarbonate solution. Distill the solvent and remove any unreacted ester by heating to 130° C. in a vacuum. Crystallize from isopropyl acetate to yield N-3,4-dimethoxyphenethyl mandelic amide, M.P. 106–108° C.

Part B.—Heat a mixture containing 48 g. of N-3,4-dimethoxyphenethyl mandelic amide and 1200 g. of polyphosphoric acid on a steam bath for one hour with stirring. Cool, pour onto 6 kg. of ice and water and extract with two 500 ml. portions of chloroform. Evaporate the chloroform and crystallize to yield 7,8-dimethoxy-2-oxo-1 - phenyl - 2,3,4,5 - tetrahydro - 1H - 3 - benzazepine, M.P. 199–201° C.

Part C.—Add 1 g. of potassium t-butylate to a solution of 12 g. of 7,8 - dimethoxy - 2 - oxo - 1 - phenyl - 2,3,4,5-tetrahydro - 1H - 3 - benzazepine in 200 ml. of dry dimethylformamide and stir for five minutes, add, in a dropwise manner, to the resulting red solution 4 ml. of acrylonitrile and stir for one hour. Pour the solution into 600 ml. of ice and water, stir until the oil solidifies, filter and wash. Recrystallize to yield 3 - (β-cyanoethyl)-7,8-dimethoxy - 2 - oxo - 1 - phenyl - 2,3,4,5-tetrahydro-1H-3-benzazepine, M.P. 228–230° C.

Part D.—Hydrogenate 5 g. of 3-(β-cyanoethyl)-7,8-dimethoxy-2-oxo-1-phenyl-2,3,4,5-tetrahydro-1H-3-benzazepine by the procedure described in Example 1, Part B. Remove the catalyst by filtration and concentrate the filtrate in vacuo, cystallize from acetonitrile to yield 3-(3-aminopropyl)-7,8-dimethoxy-2-oxo-1-phenyl-2,3,4,5-tetrahydro-1H-3-benzazepine, M.P. 189–190.5° C.

Part E.—Reflux 5 g. of 3-(3-aminopropyl)-7,8-dimethoxy - 2-oxo-1-phenyl-2,3,4,5-tetrahydro-1H-3-benzazepine with 25 g. of lithium aluminum hydride in 50 ml. of dioxane. Add a solution of water and sodium hydroxide to the mixture, filter, wash and recrystalize. Dissolve the base in 100 ml. of acetonitrile and add two molar equivalents of maleic acid and heat the resulting mixture until all the acid dissolves. Cool, filter and recrystallize from ethanol to yield 3-(3-aminopropyl)-7,8-dimethoxy-1-phenyl-2,3,4,5-tetrahydro-1H-3-benzazepine dimaleate, M.P. 171–172° C.

EXAMPLE 4

(1)-3-(2-aminoethyl)-7,8-dimethoxy-1-phenyl-2,3,4,5-tetrahydro-1H-3-benzazepine dimaleate Part A.—Reflux a solution of 56.6 g. of (1)-7,8-dimethoxy-1-phenyl-2,3,4,5-tetrahydro-1H-3-benzazepine and 7.5 g. of chloroacetonitrile in 350 ml. of dry benzene for twenty-four hours. Cool, wash with water and with 1 N-hydrochloric acid and evaporate the benzene in vacuo. Dissolve the residue in isopropyl ether containing 5% isopropylacetate, decolorize with charcoal, cool and filter to yield (1) - 3-(cyanomethyl)-7,8-dimethoxy-1-phenyl-2,3,4,5 - tetrahydro - 1H-3-benzazepine, M.P. 108–109° C., $[\alpha]_D^{26}$—40.7° C., c.=1% in ethanol.

Part B.—Hydrogenate 10 g. of (1)-3-(cyanomethyl)-7,8-dimethoxy-1-phenyl-2,3,4,5-tetrahydro-1H-3-benzazepine with 1 g. of 5% palladium on alumina catalyst in 250 ml. of ethanol saturated with ammonia. When the calculated amount of hydrogen has been absorbed, filter the catalyst and evaporate to dryness in vacuo to obtain the base as a colorless oil. Convert the base to the dimaleate salt with two molar equivalents of maleic acid in ethanol to yield (1)-3-(2-aminoethyl)-7,8-dimethoxy-1-phenyl-2,3,4,5-tetrahydro-1H-3-benzazepine dimaleate, M.P. 128–130° C., $[\alpha]_D^{26}$—10.7° C., c.=1% in dimethylformamide.

EXAMPLE 5

(1)-3-(3-aminopropyl)-7,8-dimethoxy-1-phenyl-2,3,4,5-tetrahydro-1H-3-benzazepine maleate Part A.—Reflux 20 g. of (1)-7,8-dimethoxy-1-phenyl-2,3,4,5-tetrahydro-1H-3-benzazepine and 10 ml. of acrylonitrile in 300 ml. of isopropanol according to the procedure of Example 1, Part A. Crystallize from ethanol to yield (1) - (2-cyanoethyl)-7,8-dimethoxy-1-phenyl - 2,3,4,5-tetrahydro-1H-3-benzazepine, M.P. 89.5–91.5° C., $[\alpha]_D^{26}$—13.7° C., c.=1% in ethanol.

Part B.—Hydrogenate the (1)3-(2-cyanoethyl)-7,8-dimethoxy-1-phenyl-2,3,4,5-tetrahydro-1H-3-benzazepine of Part A of this example according to the procedure of Example 1, Part B. Convert to the maleate salt in isopropanol to yield (1) - 3-(3-aminopropyl)-7,8-dimethoxy-1-phenyl-2,3,4,5-tetrahydro-1H-3-benzazepine maleate, M.P. 133–136° C., $[\alpha]_D^{26}$—14.7° C., c.=1% in ethanol.

EXAMPLE 6

(1)-3-(3-methylaminoprpyl)-7,8-dimethoxy-1-phenyl-2,3,4,5-tetrahydro-1H-3-benzazepine dimaleate Dissolve 15.5 g. of (1)-3-aminopropyl)-7,8-dimethoxy-1-phenyl-2,3,4,5-tetrahydro-1H-3-benzazepine in 200 ml. of chloroform and add in a dropwise manner with cooling, 7.2 g. of ethyl chloroformate. After one hour, add 2 ml. of pyridine, stir for four hours, add 5 ml. of water and stir overnight. Wash with 50 ml. of water, 20 ml. of 10% sodium carbonate and finally with 100 ml. of water. Evaporate the chloroform in vacuo to obtain a viscous brown oil. Dissolve 15 g. of the oil in 100 ml. of tetrahydrofuran and add this solution, in a dropwise manner, to a stirred suspension of 3.7 g. of lithium aluminum hydride in 400 ml. of tetrahydrofuran. Reflux for three hours, cool in an ice bath and add, in a dropwise manner, to this mixture sequentially, 13.5 ml. of water, 3.5 ml. of 15% sodium hydroxide and 10.5 ml. of water. Stir until the gray color changes to white filter, dry the filtrate with anhydrous potassium carbonate, filter and evaporate the solvent. Add two molar equivalents of maleic acid in ethanol to yield (1) - 3 - (3-methylaminopropyl)-7,8-dimethoxy-1-phenyl-2,3,4,5-tetrahydro-1H-3-benzazepine dimaleate, M.P. 163–164.5° C., $[\alpha]_D^{26}$—10.3° C., c.=1% in dimethylformamide.

EXAMPLE 7

(1)-3-(3-dimethylaminopropyl)-7,8-dimethoxy-1-phenyl-2,3,4,5-tetrahydro-1H-3-benzazepine dimaleate Dissolve 11 g. of (1)-3-(3-aminopropyl)-7,8-dimethoxy-1-phenyl-2,3,4,5-tetrahydro-1H-3-benzazepine in 50 ml. of formic acid. Add 20 ml. of 37% formaldehyde and reflux on a steam bath for twenty hours. Acidify to Congo Red with concentrated hydrochloric acid and evaporate to dryness in vacuo. Redissolve in 5% hydrochloric acid and evaporate to dryness in vacuo. Dissolve in water, basify with excess sodium hydroxide and extract with ether. Dry with potassium carbonate, filter and evaporate the ether. Convert to dimaleate salt in isopropanol, to yield (1) - 3-(3-dimethylaminopropyl)-7,8-dimethoxy-1-phenyl - 2,3,4,5-tetrahydro-1H-3-benzazepine dimaleate, M.P. 167.5–168.5° C., $[\alpha]_D^{26}$—7.9° C., c.=1% in dimethylformamide.

Other representative compounds within the scope of this invention are:

3-(3-aminoisobutyl)-7,8-dichloro-1-phenyl-2,3,4,5-tetrahydro-1H-3-benzazepine;
3-(2-propylaminoethyl)-7,8-propylenedioxy-1-phenyl-2,3,4,5-tetrahydro-1H-3-benzazepine;
3-(5-dimethylamino-2-methyl-pentyl)-7-methyl-1-phenyl-2,3,4,5-tetrahydro-1H-3-benzazepine;
3-(3-aminopropyl)-7,8-dihydroxy-1-phenyl-2,3,4,5-tetrahydro-1H-3-benzazepine; and
3-(5-propylamino-n-pentyl)-7-propoxy-1H-3-benzazepine.

The compounds of this invention effect a relaxation of spastic skeletal musculature upon the administration of a therapeutically effective quantity of the compounds in admixture with a suitable pharmaceutical carrier. Therefore, as such, these compounds are useful in those conditions where it is desirable to obtain a relaxation of spastic skeletal musculature without affecting normal muscle tone.

It is a desired goal in treating conditions of muscular spasticity to relieve the spasms without causing a concomitant muscular weakness. The compounds of this invention exert a central action effecting the desired relaxation without causing myasthenia. Another undesirable side effect often elicited when using muscle relaxants is that of ataxia. Quite surprisingly, it has been found that the compositions of this invention do not cause ataxia when administered within their therapeutic dosage range.

In determining the efficacy of compounds as muscle relaxants, the following test is employed. Male CF No. 1 mice, weighing 20–25 grams, are treated orally or subcutaneously with the test drug 30 minutes before challenging with etonitazine (0.2 mg./kg. subcutaneously). The mice are then scored for abdominal and whole body rigidity at 5 and 15 minutes postetonitazine. Abdominal rigidity is evaluated by measuring resistance of abdominal muscles to touch and is scored on a quantal basis; rigidity (+) or normal (0). Whole body rigidity is evaluated by measuring resistance of the muscles (on each side of the body) to touch and is also in the hereinabove described manner. Most mice receiving etonitazine alone develop both abdominal and whole body rigidity at both 5 and 15 minutes post-etonitazine. Results are expressed as percent (%) reduction of rigidity and are calculated by the following formula:

$$\frac{\text{Total control score} - \text{total drug score}}{\text{Total control score}} \times 100$$

It has been determined from results obtained in the hereinabove described test procedure that the compounds of this invention elicit a muscle relaxant effect at about 0.5 mg./kg. to about 2.0 mg./kg. of body weight on a daily basis. Preferably, these compounds are formulated into compositions that are so proportioned as to afford a unit dosage of from about 1 to about 100 mg. of the compound of the invention. The compounds are preferably administered by the oral route.

The therapeutically active substituted 1H-3-benzazepines of this invention can be administered orally in the form of tablets, capsules, elixirs, and the like, rectally, or may be administered by parenteral injection. In table form they are compounded with an inert pharmaceutical carrier which may contain a suitable binder such as, for example, gums, starches, and sugars. They may also be incorporated into gelatin capsules or formulated into elixirs which have the advantage of being susceptible to manipulations in flavor by the addition of standard natural or synthetic flavoring agents. Highly satisfactory administration may also be achieved in the form of aqueous parenteral suspensions.

As with any class of substituents there are those which are members of the class which are preferable to the other members thereof. Regarding the compositions of this invention and their use in their process aspect, the preferred embodiments are:

(1) d,l - 7,8 - dimethoxy-1-phenyl-3-(3-amino-2-methylpropyl)-2,3,4,5-tetrahydro-1H-3-benzazepine maleate
(2) (1) - 7,8 - dimethoxy-1-phenyl-3-[N-methyl-amino-3-dimaleate propyl]-2,3,4,5-tetrahydro-1H-3-benzazepine
(3) d,l - 7,8 - dimethoxy-1-phenyl-3-(3-aminopropyl)-2,3,4,5-tetrahydro-1H-3-benzazepine dimaleate, and
(4) 1 - 7,8 - dimethoxy-1-phenyl-3-(3-aminopropyl)-2,3,4,5-tetrahydro-1H-3-benzazepine maleate.

The following examples are representative of formulations containing compounds of this invention.

TABLET FORMULATIONS

Formula A (5 mg.): Milligrams per tablet
3 - (3 - aminopropyl)-7,8-dimethoxy-2,3,4,5-tetrahydro-1H-3-benzazepine dimaleate --- 5.0
Starch, food grade ---------------------- 5.0
Lactose, U.S.P. (spray dried) ------------ 89.5
Magnesium stearate, U.S.P. -------------- 0.5

100.0

Formula B (25 mg.):
3 - (3 - aminopropyl)-7,8-dimethoxy-2,3,4,5-tetrahydro-1H-3-benzazepine dimaleate --- 25.0
Starch, food grade ---------------------- 10.0
Lactose, U.S.P. (spray dried) ------------ 164.0
Magnesium stearate, U.S.P. -------------- 1.0

200.0

Pass the 3 - (3 - aminopropyl)-7,8-dimethoxy-2,3,4,5-tetrahydro-1H-3-benzazepine dimaleate through a high speed mill equipped with a 100 to 150 mesh screen. Blend the milled 3 - (3 - aminopropyl)-7,8-dimethoxy-2,3,4,5-tetrahydro-1H-3-benzazepine dimaleate with the starch in a suitable mixing vessel. Add an equal weight of the spray dried lactose to the blend and mix until uniform. Combine the resultant blend with the remainder of the spray dried lactose and mix until uniform. Charge the magnesium stearate with a portion of the active tablet mix and blend. Blend the magnesium stearate mix with the remaining active tablet base. Continue mixing until uniform. Compress to target weight (100.0 mg. for 5 mg. tablet and 200.0 mg. for 25 mg. tablet).

CAPSULE FORMULATIONS

Formula: Milligrams per capsule
3 - (3 - aminopropyl)-7,8-dimethoxy-2,3,4,5-tetrahydro-1H-3-benzazepine dimaleate --- 5.0
Lactose, U.S.P. (spray dried) ------------ 292.0
Magnesium stearate, U.S.P. -------------- 3.0

300.0

Blend ingredients until uniformly mixed. Fill into hard gelatin capsule.

PARENTERAL SUSPENSION

Formula A (5 mg.): Milligrams per milliliter
3-(3 - aminopropyl) - 7,8 - dimethoxy-2,3,4,5-tetrahydro-1H-3-benzazepine dimaleate --- 5.00
Methyl cellulose, 15 cps. U.S.P. ---------- 0.05
Sodium citrate, dihydrate ---------------- 6.00
Benzyl alcohol, NF ---------------------- 9.00
Methylparaben, U.S.P. ------------------- 1.80
Propylparaben, U.S.P. ------------------- 0.20
Water for injection, U.S.P. --------------- 1.00

Formula B (25 mg.):
3-(3 - aminopropyl)-7,8-dimethoxy-2,3,4,5-tetrahydro-1H-3-benzazepine dimaleate ----- 25.00
Methyl cellulose, 15 cps., U.S.P. ---------- 0.25
Sodium citrate, dihydrate ---------------- 30.00
Benzyl alcohol, NF ---------------------- 9.00
Methylparaben, U.S.P. ------------------- 11.80
Propylparaben, U.S.P. ------------------- 0.20
Water for injection, U.S.P. (q.s.) (a.d.) ----- 1.00

Charge 45 liters of water for injection into a suitable stainless steel vessel and heat to 85–90° C. With vigorous agitation, slowly sprinkle the methyl cellulose into the hot water (5 mg. for Formula A or 25 for Formula B). Agitate until the methyl cellulose is thoroughly dispersed and wetted. Add approximately 30 liters of cold (0–5° C.) water for injection. Cool the entire mixture to 8° C. Dissolve the sodium citrate (600 gm. of Formula A or 3000 gm. for Formula B) in enough water for injection to make 5 liters of solution. Slowly and with agitation add this solution to the cooled methyl cellulose solution. Dissolve the parabens (180 gm. of methyl and 20 gm. of propyl) in 900 g. of benzyl alcohol which has been heated to 30° C. Charge this solution to the chilled methyl cellulose solution. Bring the resulting solution to 90 liters with water for injection and agitate until uniform. In a sterile area, pass the batch through a sterile filter. Asceptically transfer about 3.5 liters of the sterile methyl cellulose solution to a separate container reserving the remainder of the batch in a sterile stainless steel mixing tank. Slurry the 3-(3-aminopropyl)-7,8-dimethoxy-2,3,4,5-tetrahydro-1H-3-benzazepine dimaleate in a sterile colloid mill with about 2 liters of the separated methyl cellulose solution and add the slurry to the solution in the mixing tank. Rinse the slurry container and the mill with the remaining 1.5 liters of reserved methyl cellulose solution and add the rinse to the mixing tank. Rinse the slurry container and mill with 2 liters of water for injection and add the rinse to the mixing tank to 100 liters with water for injection and agitate until uniform. The batch affords 100 liters of sterile suspension having the proportions of Formula A or Formula B.

I claim:

1. A process for producing skeletal muscle relaxation which comprises administering to an animal species suffering from a spastic condition of the skeletal musculature, a therapeutically effective quantity of a substituted 1- phenyl-2,3,4,5-tetrahydro-1H-3-benzazepine compound represented by the structural formula:

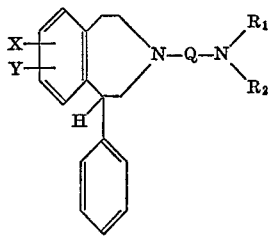

and the optical isomers and the pharmaceutically acceptable acid addition salts thereof, wherein X and Y are members independently selected from the group consisting of hydrogen, lower alkyl, lower alkoxy, halogen, hydroxy, and taken together form alkylenedioxy having up to 3 carbon atoms; Q is lower alkylene, and $R_1$ and $R_2$ are members independently selected from the group consisting of hydrogen and lower alkyl.

2. A process according to claim 1 wherein X and Y are lower alkoxy and $R_1$ and $R_2$ are hydrogen.

3. A process according to claim 2 wherein Q is propylene.

4. A process according to claim 3 wherein X and Y are methoxy, the compound being 7,8-dimethoxy-1-phenyl-3-(3-aminopropyl)-2,3,4,5-tetrahydro-1H-3-benzazepine.

5. A process according to claim 3 wherein X and Y are methoxy, the compound being 1-7,8-dimethoxy-1-phenyl-3-(3-aminopropyl)-2,3,4,5-tetrahydro-1H-3-benzazepine.

6. A process according to claim 1 wherein X and Y are lower alkoxy, $R_1$ is lower alkyl and $R_2$ is hydrogen.

7. A process according to claim 6 wherein Q is propylene.

8. A process according to claim 7 wherein X and Y are methoxy and $R_1$ is methyl, the compound being 1-7,8-dimethoxy-1-phenyl-3-(N-methylamino-3-propyl)-2,3,4,5-tetrahydro-1H-3-benzazepine.

9. A process according to claim 1 wherein X and Y are lower alkoxy and $R_1$ and $R_2$ are lower alkyl.

10. A process according to claim 9 wherein Q is propylene.

11. A process according to claim 10 wherein X and Y are methoxy and $R_1$ and $R_2$ are methyl, the compound being 1-7,8-dimethoxy-1-phenyl-3-(3-dimethylaminopropyl)-2,3,4,5-tetrahydro-1H-3-benzazepine.

References Cited
UNITED STATES PATENTS 3,496,166  2/1970  Mull et al. _____ 260—244

OTHER REFERENCES

Gordon: Psychopharmacological Agents, vol. I (1964), 137, 142–143, 161–165, 206–208, 214.

STANLEY J. FRIEDMAN, Primary Examiner

U.S. Cl. X.R.

424—278